H. MANSFIELD.
Gate.

No. 69,108.

Patented Sept. 24, 1867.

WITNESSES
A. Haynard
J. L. Merriam

INVENTOR
H. Mansfield
By C. L. Chapin
Attorney

United States Patent Office.

H. MANSFIELD, OF WARSAW, INDIANA.

Letters Patent No. 69,108, dated September 24, 1867.

IMPROVEMENT IN GATES.

*The Schedule referred to in these Letters Patent and making part of the same.*

TO ALL WHOM IT MAY CONCERN:

Be it known that I, H. MANSFIELD, of Warsaw, in the county of Kosciusko, in the State of Indiana, have invented an attachment for hanging Gates; and I do hereby declare that the following is a full and exact description thereof, reference being had to the accompanying drawings, and to the letters of reference marked thereon, making a part of this description, in which—

Figure 1:
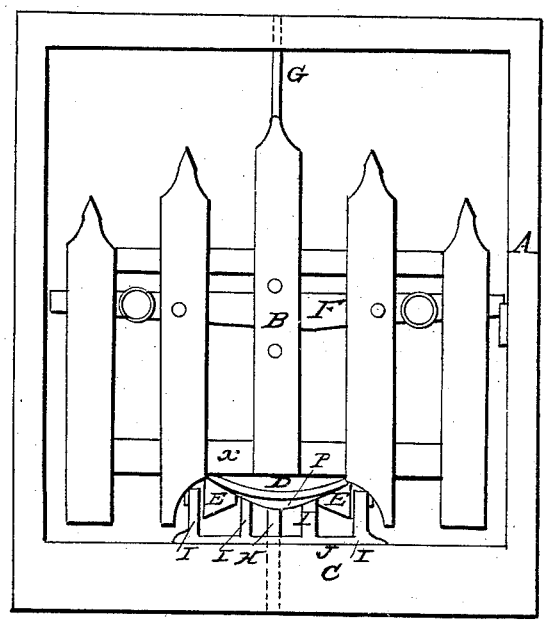

Figure 1 is an elevation of my invention.

Figure 2:
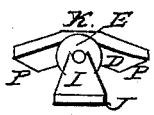

Figure 2, a transverse view of the cam and other attachments taken with the gate shut.

Figure 3:
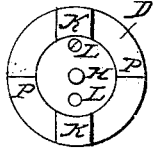

Figure 3, a view of the under side of the cam.

The nature of my invention consists in the use of a peculiar-shaped cam, attached to the bottom of a gate, and arranged to turn on conical rollers, resting on a bed-piece, in such a manner as will admit of the gate being hung at the centre and swung in either direction.

In order to give a correct understanding of my invention, I have marked corresponding parts with similar letters, and will now give a detailed description.

A represents the frame of a common centre gate, with a bed-piece, C, placed between the vertical sides of the frame A for the purpose of supporting a frame, J H I I, in which the conical rollers E E are arranged to turn. A cam, figs. 1, 2, 3, is made of any suitable metal, and in such a form as will cause the gate B to shut, after being opened, and remain closed, unless swung around by force, and in order to accomplish this purpose I make said cam D with two projections P P, so sharp that they will turn on friction-rollers E E in either direction, and thus cause the gate to shut whether wholly or partially open. Another arrangement of cam D consists in making two sharp curves K K, as seen more clearly at fig. 2, for the purpose of resting firmly upon friction-rollers E E, and thus hold gate B shut, or so as to remain parallel with a line of the fence. I regard the two arrangements referred to as important, especially when used in conjunction with the conical rollers E E, for the purpose desired. The object of making them in the form of truncated cones is for the purpose of causing the gate B to press toward the centre pivot H, and thus to keep it in position liable to produce the least amount of wear and friction. I am not particular as to the style of gate B, only so that it is susceptible of being balanced by means of cam D and rollers E E. Standards I I are made to project upward from the plate J, and have suitable boxes for the support of rollers E E, at such a height from the ground as will prevent them from being affected by snow and ice. In drawing 1 the centre of the gate is represented as cut away for the convenience of attaching the cam D to the lower rail X by means of screws L L, shown at fig. 3. The gate is held in frame A by means of a lower pivot, H, and an upper pivot, G, in the usual manner. My attachment can all be made of common cast iron, and by any person of ordinary skill.

Having thus described my invention, what I claim, is—

The cam D, having sharp projections P P, for carrying a gate shut, and the short curves K K for holding it closed, in combination with conical rollers E E, arranged to turn in the projections I I, substantially as set forth.

H. MANSFIELD.

Witnesses:
GEO. L. CHAPIN,
A. HAYWARD.